United States Patent
Boman

(10) Patent No.: US 12,231,601 B2
(45) Date of Patent: Feb. 18, 2025

(54) TECHNIQUES FOR MANAGING SOFTPHONE REPOSITORIES AND ESTABLISHING COMMUNICATION CHANNELS

(71) Applicant: Derek Allan Boman, Long Beach, CA (US)

(72) Inventor: Derek Allan Boman, Long Beach, CA (US)

(*) Notice: Subject to any disclaimer, the term of this patent is extended or adjusted under 35 U.S.C. 154(b) by 192 days.

(21) Appl. No.: 17/816,642

(22) Filed: Aug. 1, 2022

(65) Prior Publication Data

US 2023/0024052 A1 Jan. 26, 2023

Related U.S. Application Data

(62) Division of application No. 17/061,833, filed on Oct. 2, 2020, now Pat. No. 11,438,456.

(51) Int. Cl.
| | |
|---|---|
| *H04M 3/51* | (2006.01) |
| *G10L 15/22* | (2006.01) |
| *G10L 15/30* | (2013.01) |
| *G10L 25/78* | (2013.01) |

(52) U.S. Cl.
CPC .......... *H04M 3/5158* (2013.01); *G10L 15/22* (2013.01); *G10L 15/30* (2013.01); *G10L 25/78* (2013.01)

(58) Field of Classification Search
CPC .......... H04M 3/5158; H04M 2201/40; H04M 2203/2027; G10L 15/22; G10L 15/30; G10L 25/78; G06Q 30/016; G06Q 30/02
See application file for complete search history.

(56) References Cited

U.S. PATENT DOCUMENTS

| | | | |
|---|---|---|---|
| 7,894,597 B2 | 2/2011 | Walker et al. | |
| 8,681,952 B2* | 3/2014 | Agarwal | G06Q 30/02 379/88.19 |
| 9,317,855 B2* | 4/2016 | Altberg | G06Q 30/0276 |
| 9,654,627 B1* | 5/2017 | Stec | H04W 4/14 |
| 9,886,505 B2* | 2/2018 | Blass | H04M 1/72445 |
| 10,135,989 B1 | 11/2018 | Indyk et al. | |
| 2006/0074623 A1 | 4/2006 | Tankhiwale | |
| 2007/0140451 A1 | 6/2007 | Altberg et al. | |

(Continued)

FOREIGN PATENT DOCUMENTS

WO 2020081614 A1 4/2020

*Primary Examiner* — Akelaw Teshale
(74) *Attorney, Agent, or Firm* — Perkins Cole LLP

(57) ABSTRACT

Introduced here is a platform for actively managing communication channels. In particular, the communication channels are managed to increase the probability of success of a call center agent to meaningfully engage with a client. In addition, the platform provides identification information and other information to facilitate a conversation between the parties, while also reducing the pre-call preparation by an agent. The platform parses search results to identify contact information for prospect by utilizing keyword identification algorithm. During the call, the platform applies voice detection and speaker detection algorithms to ensure that the agent is speaking with a live voice, rather than a pre-recorded message. By applying these algorithms, the platform aims to increase call center efficiency and conversation rates, while reducing pre-call preparation and skepticism of a prospect.

20 Claims, 5 Drawing Sheets

(56) References Cited

U.S. PATENT DOCUMENTS

| | | | | |
|---|---|---|---|---|
| 2008/0282164 A1* | 11/2008 | Blass | ................ | H04M 1/72445 |
| | | | | 707/E17.107 |
| 2013/0198635 A1 | 8/2013 | Jones et al. | | |
| 2013/0336172 A1 | 12/2013 | Altberg et al. | | |
| 2014/0163994 A1* | 6/2014 | Lau | ....................... | H04M 1/271 |
| | | | | 704/275 |
| 2015/0134340 A1* | 5/2015 | Blaisch | ................. | G06F 16/958 |
| | | | | 704/275 |
| 2018/0103146 A1* | 4/2018 | Choe | ................... | H04L 65/1059 |
| 2022/0109754 A1 | 4/2022 | Boman | | |

\* cited by examiner

TECHNIQUES FOR MANAGING SOFTPHONE REPOSITORIES AND ESTABLISHING COMMUNICATION CHANNELS

CROSS-REFERENCE TO RELATED APPLICATIONS

This application is a divisional of U.S. patent application Ser. No. 17/061,833, titled "Techniques for Managing Softphone Repositories and Establishing Communication Channels" filed Oct. 2, 2020, now allowed, which is incorporated herein by reference in its entirety.

TECHNICAL FIELD

The present disclosure relates to telephonic communication. In particular, the present disclosure relates to establishing communication channels between a softphone and a terminal.

BACKGROUND

Multiple softphones are often utilized to establish communication channels with multiple terminals. Softphones can incorporate various types of technologies and algorithms to better the experience of a user. For example, softphones can apply sound recognition algorithms to analyze the sound heard during a call such as voices and background noises. Similarly, softphones can incorporate other algorithms such as those related to data analysis. For example, a softphone can analyze the length of a calls or the area code of a phone number to better estimate likelihood of someone answering a future call.

Further, a softphone can include memory devices. The memory devices can store data such as the results of the sound recognition analysis or the results from the data analysis in a repository. This can enable a softphone to correlate, for example, to guesstimate the characteristics of a future call. As a result, a softphone can play a large role in improving the efficiency of a high-volume call-business.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
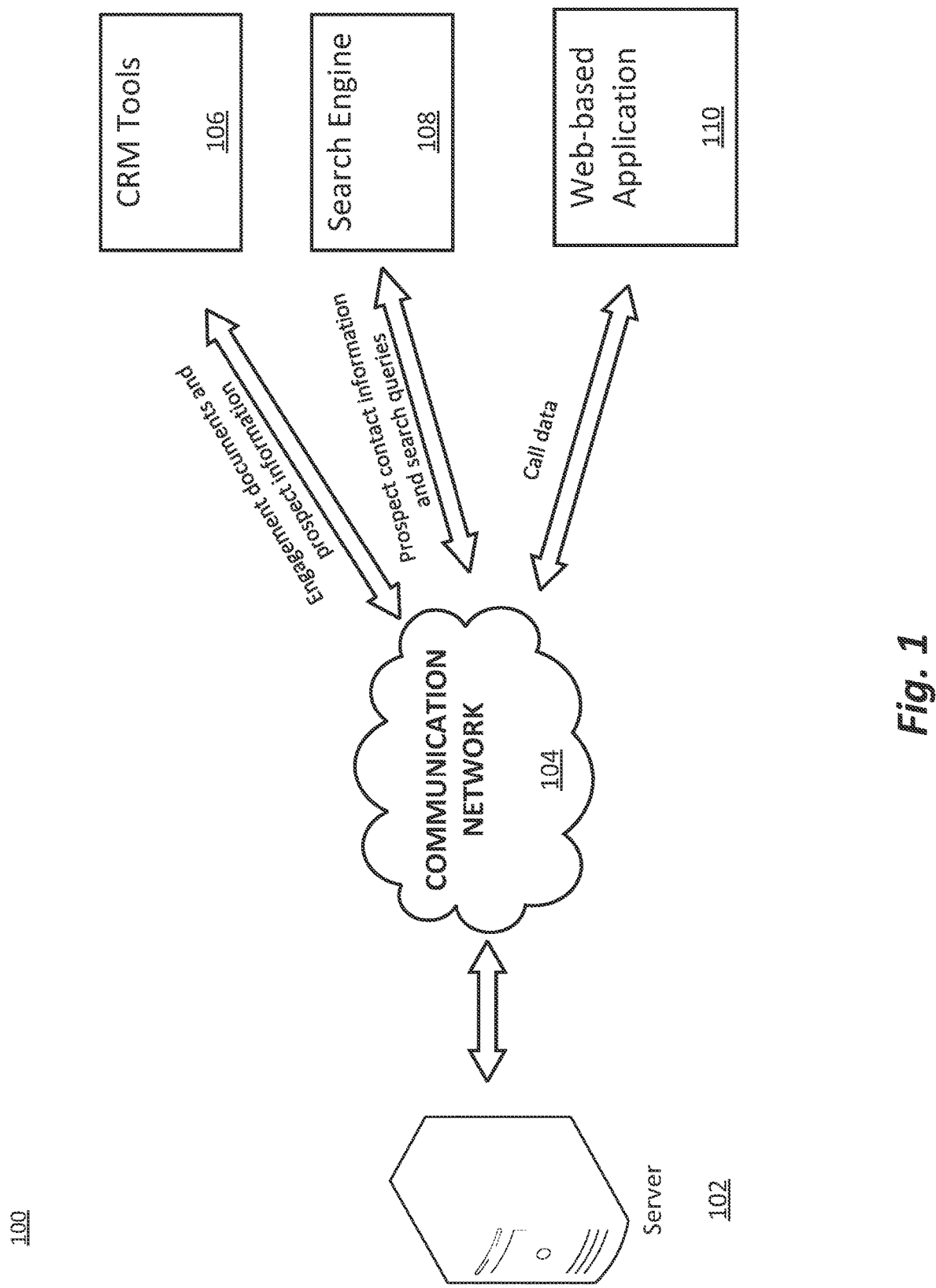
FIG. 1 depicts a network environment that includes a variety of electronic devices and electronic information sources configured to collectively help the end user.

A call center is, in general, an environment configured to handle a large volume of telephone calls, such as those made for making orders, delivering customer service, etc. In order to server the high volumes of calls, the call center agents work at an efficient pace and are trained to operate in a systemic manner. For example, agents can receive a predetermined call list with associated information. The information can include identification information, potential lead information, all associated numbers with a particular prospect, etc. Using the information, the agent can attempt to complete the given tasks.

An agent can be given a variety of tasks such as making a sales pitch, addressing customer service requests, obtaining information from the prospect, etc. If the call reaches the prospect, the agent does their best to make a meaningful connection with the prospect in order to complete the tasks. For example, if the agent is tasked with selling a widget, the agent can ask the prospect if they have a need for the widget, if they foresee a need of the widget, or just have an interest in the widget. In some cases, the agent may receive information prior to making the call regarding the prospect's interests. For example, the information (e.g., lead information) can indicate that the prospect is new a law firm and will likely need a paper supplier. Thus, the agent can be tasked with selling a paper supply to the business.

The current techniques using for addressing the volume, variety of tasks, and the stream of calls synonymous with call center environments, cause many issues.

First, an agent is inundated with a continuous steam of tasks and calls. For example, depending on the task, an agent can average between 2 minutes to 10 minutes per call. In a regular work day, the agent can make or receive approximately 200 calls. While working at this pace can, on its own, be exhausting, the agent must also be aware of relevant information prior to every call. However, the terminal does not always populate with information prior to making or receiving a call. The agent is then unprepared and in an awkward situation with the prospect. In turn, the prospect will likely experience poor service, which will increase their intuitive sense of hesitancy and/or skepticism.

Second, even in cases where the agent is made aware of the relevant information, the agent does not have liberty to customize their own list of prospects. In other words, an agent cannot transact with prospects in areas in which they may have an expertise. For example, an agent, due to prior experience, may be knowledgeable about car parts. Due to this, the agent may have taken a job at a call center than deals in the automotive space. However, the agent's daily call list may include prospects in the automotive industry that are looking to schedule service appointments, rather than buy parts. As such, the agent's knowledge is not appropriately applied.

Third, many call centers operate primarily on a commission basis. However, the current system does not customize the interaction to take advantage of an agent's talents. Similar to the issues mentioned above, an agent cannot customize their call list to increase their chances of making a sale during a call. Thus, an agent can become less enthusiastic, which can permeate throughout the work environment and be reflected in their interactions with prospects.

Fourth, societal pressure and legislation has forced call centers to drastically decrease the use of robocalls. Robocalls are automated telephone calls which deliver a recorded message. Call centers regularly use such calls as a filter. For example, a call center can call a prospect using a robocall with options such as to press 1 if interested in a widget. If the prospect presses 1, then they are redirected to an agent. However, this method has proved troublesome because most prospects disconnect the call and legislation such as the TRACED Act severely limits the situations when robocalls are permitted. This has led to a shift to the previous status quo, where call center agents have to meet high volumes with increasingly demands for efficiency, which have again highlighted the issues discussed herein.

Fifth, agents waste time doing pre-call preparation and in between calls due to the high volume and constant redialing. This issue is best illustrated with an example of the manual process of call center agents using the current technology. For example, the agent may be tasked with selling roofing equipment in Texas. The agent then performs a search, on any web-based search engine (e.g., Google), for roofing businesses in Texas. The agent may find a hundred businesses. After which, the agent creates a list of phone numbers from the search results and associates the phone numbers with at least a first name. In some cases, multiple names can be associated with one phone number, or multiple phone numbers with one name. In either case, the agent then performs another search with the name(s) and the phone number(s). The agent can repeat the search for every name associated with the number. Subsequently, the agent updates the lists based on the new search results. Lastly, the agent organizes the search results and dials each number sequentially. Therefore, the agent has spent a significant amount of time prior to making the first call.

Therefore, there is a need for techniques which enable an agent to meaningfully engage with a prospect while also keeping up with the pace of a call center environment.

Introduced here is a platform for increasing the probability of meaningfully engaging with a prospect. The techniques can enable an agent to, for example, organize prospects in a manner that increases conversion rates, decrease pre-call preparation times, and reduce the initial awkwardness of a cold call. In particular, the system utilizes machine learning algorithms to distinguish live voice connections so as to not waste an agent's time.

In some embodiments, the system, first, requires filtering by a user to determine which group of numbers should be dialed. Second, the system can further filter to close the communication channels associated with non-live voices or voices that are not indicative of the expected voice. Third, the system prompts the user to close the remaining communication channels except the one communication channel that has a buyer present on it.

The following description the platform is implemented as a web-based application. Each agent can install the web-based application on their respective devices. The devices can be any network-connected device such as a smartphone, tablet, personal computer, etc. However, those with skill in the art will understand that other implementations of the platform are also viable, such as a software program.

In some embodiments, an agent can organize the list of prospects for dialing on a terminal (e.g., softphone or smart telephonic device). Organization can include, for example, the order of the calling list, where the calling list is sourced from, and/or criteria for creating the calling list. In some embodiments, the agent can prompt the platform to organize the call list alphabetically (e.g., by first name or last name), based on business type (e.g., restaurant, law firm, or grocery store), based on previously known needs, and/or other categories. For example, an agent can be tasked with calling every resident within a particular two-mile radius. The agent, in order to ensure that every resident is called, may prompt the system to organize the call list alphabetically by first name. Thus, the agent can pick up where they left off after a break or the next day. Similarly, in another example, an agent can be tasked with selling paper products to businesses. The agent, based on previous experience with selling paper, can know that businesses in the advertising industry require a lot of paper. Thus, the agent may prompt the platform to organize a call list based on industry.

In another example, the agent may have prior knowledge that may help make a sale. For instance, the agent may know that a business is expanding to a larger office. The agent may receive this information from word of mouth, news, other sales representatives, lead-generating sources, etc. With this information, the agent can prompt the platform to call the numbers associated with the business first. Thus, this agent may be able to sell widgets or services related to the business expansion.

In some embodiments, the capabilities of the platform can reduce the pre-call preparation that is a required by an agent and reduce the initial awkwardness of a cold call. For example, an agent must familiarize themselves with the business, their needs, the people that may answer the phone, the pronunciation of names, the location, and other relevant information that can facilitate a meaningful engagement. The platform can present the information to the agent in an order that the agent prefers to have their calls. For example, an agent may prefer to build rapport during the first few minutes of a call. Thus, the agent can prompt the platform to display the location and current events in the area first. For instance, the system can display the local weather, or news about local sports teams. Next, the agent may prefer to discuss the prospect's business or current needs associated with the widget that the agent is seller. In this case, the system may display relevant facts about the business (e.g., business type or target customers). In this way, the agents can customize the platform to provide details in an order that is convenient to the agent and thus, will allow the agent to confidently discuss with the prospect.

FIG. 1 depicts a network environment that includes a variety of electronic devices and electronic information sources configured to collectively help the end user. The network-connected environment 100 includes server 102, communication network 104, customer relations management (CRM) tools 106, search engine 108, and web-based application 110. The arrows indicate the possible exchanges of call data, prospect contact information and search queries, and engagement documents and prospect information between various component of the network-connected environment 100. In some embodiments, the network-connected environment 100 is a platform that iteratively updates one or more pieces of information that is available to an agent regarding a prospect. In some embodiments, the network-connected environment 100 may include more than one of each of the components illustrated.

Server 102 can store the algorithms that can be used for parsing search results and detecting a real person on the phone connection. In order to parse the search results, the server 102 can perform various steps at different phases to adjust the information that is displayed to an agent. The initial training of the server 102 can be done in an iterative manner and in a facility that simulates different search queries. The iterative training may be performed by comparing reference search results to unfiltered search results. By comparing the unfiltered search results to reference search results, the serve can adjust the filtering mechanisms. The iterative comparing and adjusting can lead to a server that is optimized to parse search results. In some embodiments, the iterative process can be done on a test server and the results can be uploaded on to local servers via, for example, regular software updates.

The server 102 can utilize various models or methods to parse the search results and detect a real person on the phone. A method is a collection of algorithms or data that allows for subjective evaluation. A model, for example, is a collection of search results or voice data that permits comparison with the data from new search results or voices. Parsing, also known as syntax analysis or syntactic analysis in the computational space, is user to refer to the formal analysis by a computer of a sentence or other string of words into its constituents, resulting in a parse tree showing their syntactic relation to each other, which may also contain semantic and other information. In some embodiments, the server 102 may employ algorithms such as the Chi-Square, Keygraph Keyword, or TF-IDF based algorithm to parse search results. The Chi-Square algorithm uses a statistical measure of co-occurrence of terms in a single page to determine top n keywords. Chi-square normally progresses by selecting the terms that occur frequently, clustering the frequently occurring terms, and calculating the expected probability of it occurring again. The keygraph keyword algorithm analyze the graph of term co-occurrences by using a graphical representation of the number of times a word appears in a page. TF-IDF stands for term frequency-inverse document frequency. This algorithm scores the important of terms in a document based on how frequently they appear. Other similar algorithms can also be applied.

In some embodiments, the server 102 can employ machine learning algorithms to parse the search results. For example, the server 102 can employ known in the art machine learning concepts natural language processing. Natural language processing is concerned with how to program computers to process and analyze large amount of natural language data. Natural language processing can include multiple sub-concepts. For example, the server 102 can use text segmentation to parse the search results. Text segmentation is the process of dividing text into meaningful units, such as words, sentences, or topics. Text segmentation applies rules such as identifying a space to separate words or identifying a title to recognize the topic. In another example, the server 102 can use terminology extraction. Terminology extraction allows for automatic extraction of relevant terms from a given corpus of text.

Voice detection algorithms are often classified as voice activity detection (VAD) algorithms. The typical design of a VAD algorithms is first to perform noise reduction (e.g., spectral subtraction), then select features are calculated from a section of the input signal, and then a classification rule is applied to classify the section as speech or non-speech. VAD algorithms assess spectral slope, correlation coefficients, cepstral, weighed ceptral, and modified distance measures. For example, machine learning concepts, such as VAD, can be applied to distinguish between a live voice and voicemails. For instance, an agent may dial three phone numbers simultaneously that are associated with a business. The agent need not waste time listening to the responses from all three messages because the system can automatically disconnect connections that don't have a live voice on the other end.

In some embodiments, the platform can have the voice data of the target prospect from previous interactions and disconnect connections with the wrong person on the other end. The platform can use, for example, speaker recognition algorithms that can identify a person from characteristics of voices. Speaker recognition algorithms can include both verification and identification. Verification algorithms are used to verify that the speaker is who they say they are. Identification is used to identify an unknown speaker. As such, the platform can apply techniques that are known in the art to perform verification and/or identification such as, frequency estimation, hidden markov models, gaussian mixture models, pattern matching algorithms, neural networks, matrix representations, and other similar techniques.

For example, an agent can be tasked with contacting a prospect that frequently transacts with the call center. The call center can have a database to store information regarding past interactions with prospects. The database can store for example, the contact information, address, payment details, business information, details regarding the last purchase, and data regarding their voice. Thus, in order to maximize the probability of success, the agent may only want to speak to the particular prospect when calling their business. The system can recognize the voice that answers the voice and disconnect when the particular prospect does not answer.

The call center database can also be used as a source of lead information. For example, the database can store details regarding the last purchase that a business made. For instance, a business may have signed a contract, 11 months ago, to receive paper supplies for a year. Thus, the database can alert the agent on the platform to reconnect with the business regarding renewing their contract or signing a new contract.

CRM tools 106 exchange engagement documents and prospect information with the server 102 via communication network 104. Server 102 may analyze the engagement documents and prospect information in a manner consistent with the descriptions herein and provide the information on a display to the agent. In some embodiments, the server may provide data to the CRM tools 106. For example, the server 102 may receive prospect information from another source (e.g., search engine 108) and relay the information to the CRM tools 106. In some embodiments, the CRM tools 106 can be incorporated into other elements (e.g., web-based application 110) as, for example, a hyperlink.

Search engine 108 and server 102 can exchange, via the communication network 104, prospect contact information and search queries. The search engine 108 can be a web-based search engine such as Google. In some embodiments, the search engine 108 can operate independently of the other elements of the network-connected environment 100 while communicating to the other elements via the communication network 104. Additionally or alternatively, search engine 108 can be incorporated into other elements (e.g., web-based application 110) as, for example, an application programming interface (API) or hyperlink.

Web-based application 110 operates as the front-end of the system. In other words, the web-based application 110 can interact with the agent. In some embodiments, the web-based application 110 can transmit and receive, via communication network 104, call data from server 102. In some embodiments, web-based application 110 can be configured to make calls over a network such a via voice-over internet protocol (VOIP) networks, wireless networks, etc. The web-based application 110 can operate on a network-connected device such as a smart phone, table, personal computer, or the like. The web-based application 110 can include multiple softphones, soft buttons, and/or information boxes. In some embodiments, the web-based application 110 can include the search engine 108 and CRM tools 106, as mentioned above, via hyperlinks and/or APIs.

For example, an agent may be using web-based application 110 to cold call prospects. Rather than the manual method described above, the agent can input a target (e.g., business, locale, or person) in to a search box on a page of the web-based application 110. The web-based application 110 can prompt the search engine 108, via communication network 104 and server 102, to make the search. The results can be presented to the web-based application 110 to organize the results based on the agent's preference (e.g., alphabetical order or location). The web-based application 110 can also associate each number with additional information such as the name of the business, the industry, etc. In some embodiments, the server 102 can process the search results and subsequently, provide instructions to the web-based application 110 to display the information to the agent.

In some embodiments, the web-based application 110 may also provide information in a sequential manner as preferred by the agent. For example, the agent may prompt the web-based application 110 to present information related to person first, then related to the location and business, then related to the assigned task (e.g., selling a widget). As the conversation progresses, the prospect may agree to buy a widget, for example. Thus, the agent can prompt via, for example, a hyperlink, CRM tools 106. The CRM tools 106 can provide engagement documents to the web-based application 110 via communication network 104 and server 102. In some embodiments, the server 102 may locally store frequently used engagement documents from CRM tools 106.

In another example, the agent may be tasked with selling roofing equipment in Texas. To do so, the agent may open web-based application 110 on their network-connected device and prompt the search engine 108 to search for roofing companies in Texas. The search query and results (e.g., prospect contact information) can be exchanged between the web-based application 110 and search engine 108 via communication network 104 and server 102. In some embodiments, the server 102 may provide instructions to search engine 108 based on the search query entered in web-based application 110. The search engine 108 can provide the search results to the web-based application 110 for presentation to the agent. In some embodiments, the server may process and organize the search results (e.g., alphabetically).

In some embodiments, the elements of network-connected environment 100 can be incorporated within the same device. Multiple devices can be used for this purpose, such as personal computer, tablet computer, personal digital assistant (PDA), mobile phone, game console, music player, wearable electronic device (e.g., a watch or fitness accessory), network-connected ("smart") electronic device, (e.g., a television or home assistant device), virtual/augmented reality system (e.g., a head-mounted display), or some other electronic device. For example, an agent can use their iPhone to operate web-based application 110.

Figure 2:
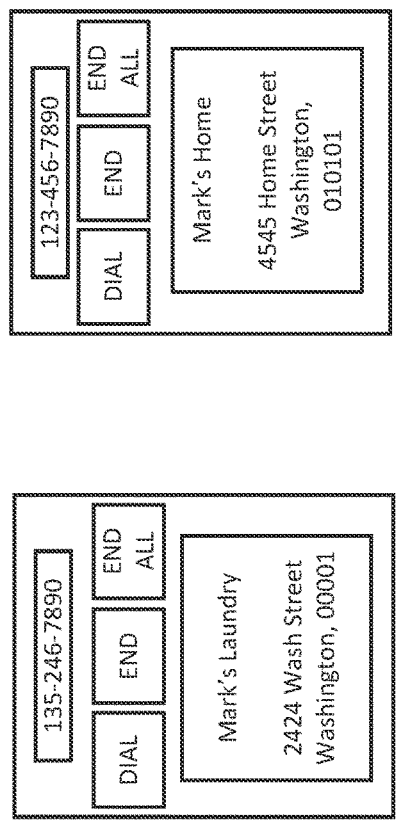
FIG. 2 depicts an exemplary display of a terminal used by an end user.

FIG. 2 depicts an exemplary display of the platform used by an end user. The display 200 can be a page of the web-based application 110 described in conjunction with FIG. 1. Display 200 can include multiple softphones, a data box with the phone numbers associated with the search query, a data box with information associated with the search query, text box to start a new search, and other relevant input or display fields. In some embodiments, the platform can dial multiple softphones simultaneously and once the prospect answers one of the phones, the platform can automatically terminate the others. In some embodiments, each soft phone displays identification information of the prospect.

In FIG. 2, the softphones are associated with Mark. As such, the softphones can connect to Mark's laundry business, home, and cell phone. The display 200 can also display additional numbers that were parsed from the search results. The additional numbers can vary based on the breadth of the search. For example, if the agent searched "Mark", there would an innumerable amount of phone numbers. As such, here the agent may have searched Mark's Laundry in Washington. Additionally, the display 200 can also include additional information pulled from the search results such as commonly found words or phrases, or from known tips from lead generating sources (e.g., call center database). For example, an agent may search "Mark's Laundry" and the results may include all the phone numbers in the Phone #'s data box. However, based on location, the agent may filter the display to only Washington area codes and subsequently, dial those numbers.

The information data box can be populated with commonly appearing words or phrases. Here, for example, Mark's laundry is a family-owned business located in Washington that is opening a new location. The system can detect that Mark's laundry is opening a new location through advertisements, new rental agreements, or other public information. Additionally, the agent can modify the information data box. For example, the agent may prefer to initially discuss local news to build rapport with the prospect. Accordingly, the agent can adjust the settings of the information data box to display local news as the first three talking points.

Display 200 can also include other features such as buttons to disconnect a call or all calls, pause a call, redial, merge multiple calls, transfer calls, a digital telephone keypad, etc. Display 200 can also include features such as multiple softphones, a queue box indicating the next numbers to be dialed, a hyperlink box to provide portals to other sources (e.g., search engine and/or CRM tools), video box, etc. The display 200 can be color codes to visually indicate to the agent which softphone has, for example, a live voice.

Figure 3:
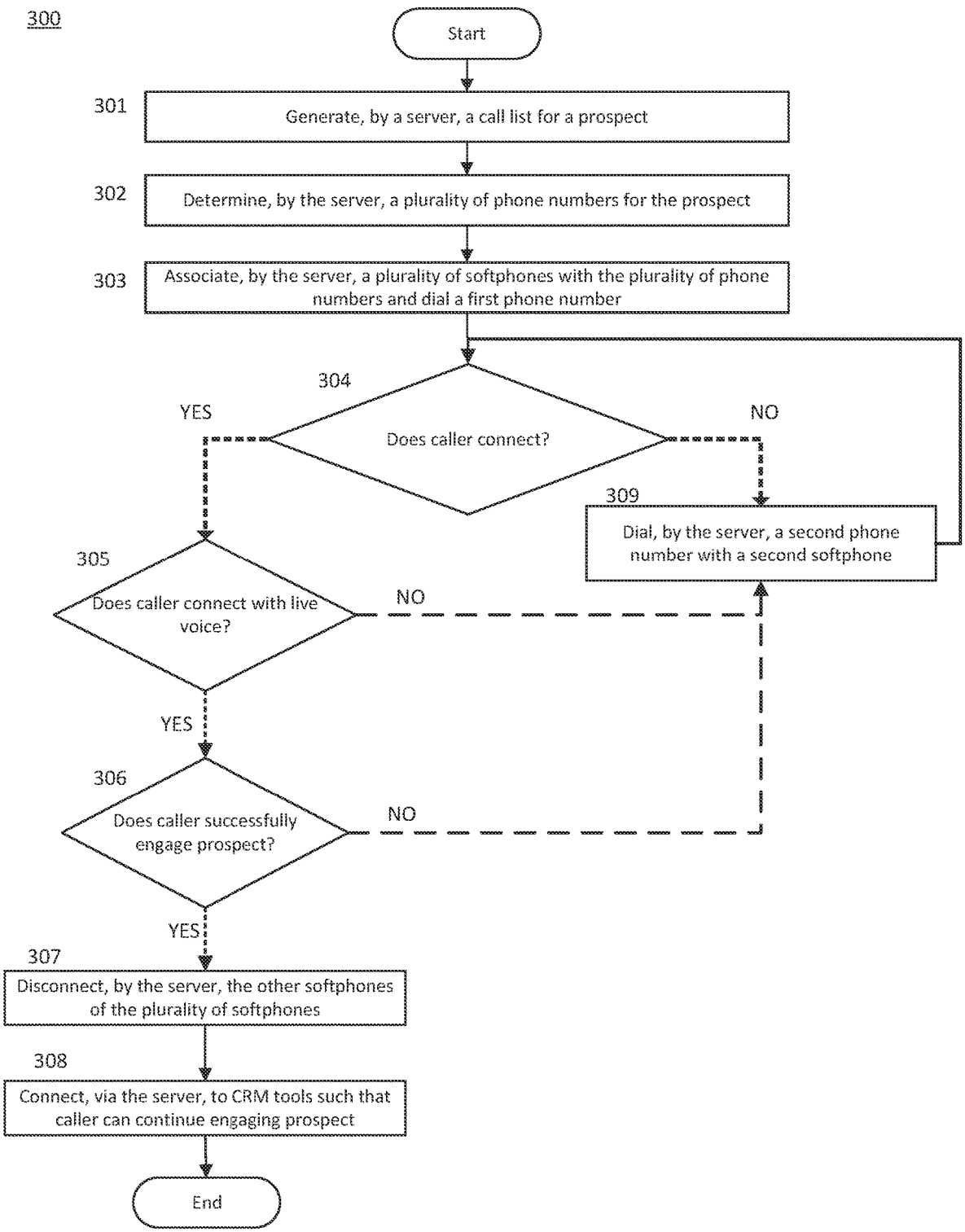
FIG. 3 is a flowchart illustrating a method performed by a server to enable connection with a prospect.

FIG. 3 is a flowchart illustrating a method performed by a server to enable connection with a prospect. The method can be performed by a local server onboard a network-connected device or an external server that is communication with a network-connected device. By performing the method, a server, autonomously identifies telephonic numbers associated with an active user and provides identification information of the active user on a device. The device can be a network-connected device with a display such as a smartphone, tablet, or personal computer. Moreover, the device can be configured to provide haptic feedback by vibrating to provide an alert to an agent. For example, the device can vibrate when a live voice is detected.

In some embodiments, the device has top surface that is touch sensitive by detecting changes in capacitance cause an object (e.g., a finger) being in close proximity to the top surface. For example, the display that displays the softphones and buttons can be a touch screen and illuminated by a light source. In another example, the display can touch screen and the top surface can include physical buttons for at least some of the operations (e.g., end call).

In some embodiments, the device can include a processor that is capable of executing instructions stored in the memory. For example, the memory can be external to the device and communicatively coupled to the device via communication protocol (e.g., internet protocol). For instance, the memory can store the data from previous interactions with a prospect and the algorithms necessary to implement voice recognition. The device can use the data and instructions from the memory to detect a live voice during an exchange with an agent.

The method performed by the device can include multiple steps and variations to be able to autonomously identify telephonic numbers associated with an active user and provide identification of the active user. At 301, a server onboard a network connected device can parse a call list that include identification information of a user (e.g., a prospect) and multiple telephonic numbers that are associated with user. The device can receive the information within the call list from multiple sources such as call history logs, digital phone books, business websites, social media websites, or other similar sources. For example, an agent can search a user's name and the device can parse through search results to display phone numbers and identification data. In some embodiments, the information in the call list is retrieved from search results that based on search criteria such as location, first name, last name, area code, type of business, and/or any other information that may help the agent.

At 302, the server can determine multiple phone numbers for the prospect. In some embodiments, the server can group telephonic numbers into batch of telephonic numbers based on the identification information. Further, there can be multiple users and the server group the telephonic numbers based on the user. The identification information can be, for example, the first name of the user, the last name of the user, the name of the business of the user, the type of business, the location of the device associate with the number, and/or any other information that may help the agent during the interaction with the user.

At 303, the server can associate the batch of telephonic numbers with softphones and dial the numbers on the softphones to form a communication channel between the softphones and the devices that are associated with the telephonic numbers. For example, one softphone could form a communication channel with one device associated with one telephonic number. Additionally, the server can dial multiple softphones simultaneously or one after another (e.g., in succession) based on determining whether there a live voice on the other end. If there isn't a live voice, then the server can disconnect the communication channel prior to dialing the next telephonic number on the same or different softphone. Additionally, the server can display, for the agent, the telephonic numbers that will be dialed in the future along with the identification information associated with each telephonic number.

At 304, the server can determine if a connection is made. In some embodiments, determining whether a connection is made can include applying voice recognition or speech recognition algorithms. For example, data from the phone call (e.g., communication channel) can be sent to the server for analysis in real-time. The serve can apply, for instance, hidden markov models to determine whether a caller has answered (e.g., a user says hello). In some embodiments, the server can differentiate between the sound of a ring and a voice, thus indicating that the called connected with a prospect. In some embodiments, the server can different between a male and female voice, an adult and child voice, or other such differentiations. If the caller does connect, at 305, while the communication channel is still open, the server can determine if the user is actively present on the communication channel. Similar to 304, the server can analyze the call data to determine whether the caller connects with a live voice. The analysis can include applying algorithms related to voice recognition, speech recognition, comparisons to existing data repositories, etc. For example, the server can apply neural networks to detect particular phonemes with the call data. In some embodiments, 305 can include applying algorithms to detect the identify of the prospect based on stored data from previous interactions with the prospect. This is further described in conjunction with FIG. 4.

If the user is not present on one or a batch of communication channels, the server terminates those communication channel and opens new ones with new telephonic numbers, at 309. If the user is active, at 307, the server can terminate all other communication channels except the active one. Upon determining the active communication channel, the server can store the telephonic number associated with the active communication channel for future interactions with the user (e.g., as a default). Alternatively, if the user is not active of any of the communication channels, the server can dial a new set of telephonic associated with a different user, at 309. In some embodiments, the server can utilize speaker recognition algorithms to compare the call data from previous interactions with the user with the present interaction. The call data can include the voice characteristics of the user.

In some embodiments, the agent can be tasked with selling a widget to the user. In which case, if the agent succeeds, the server can provide access to CRM tools to facilitate the sale of the widgets at 308. The CRM tools can provide closing documents such as a sales contract, an agreement to purchase, disclosure documents, a liability waiver, payment forms, or other documents needed to close the transaction.

Figure 4:
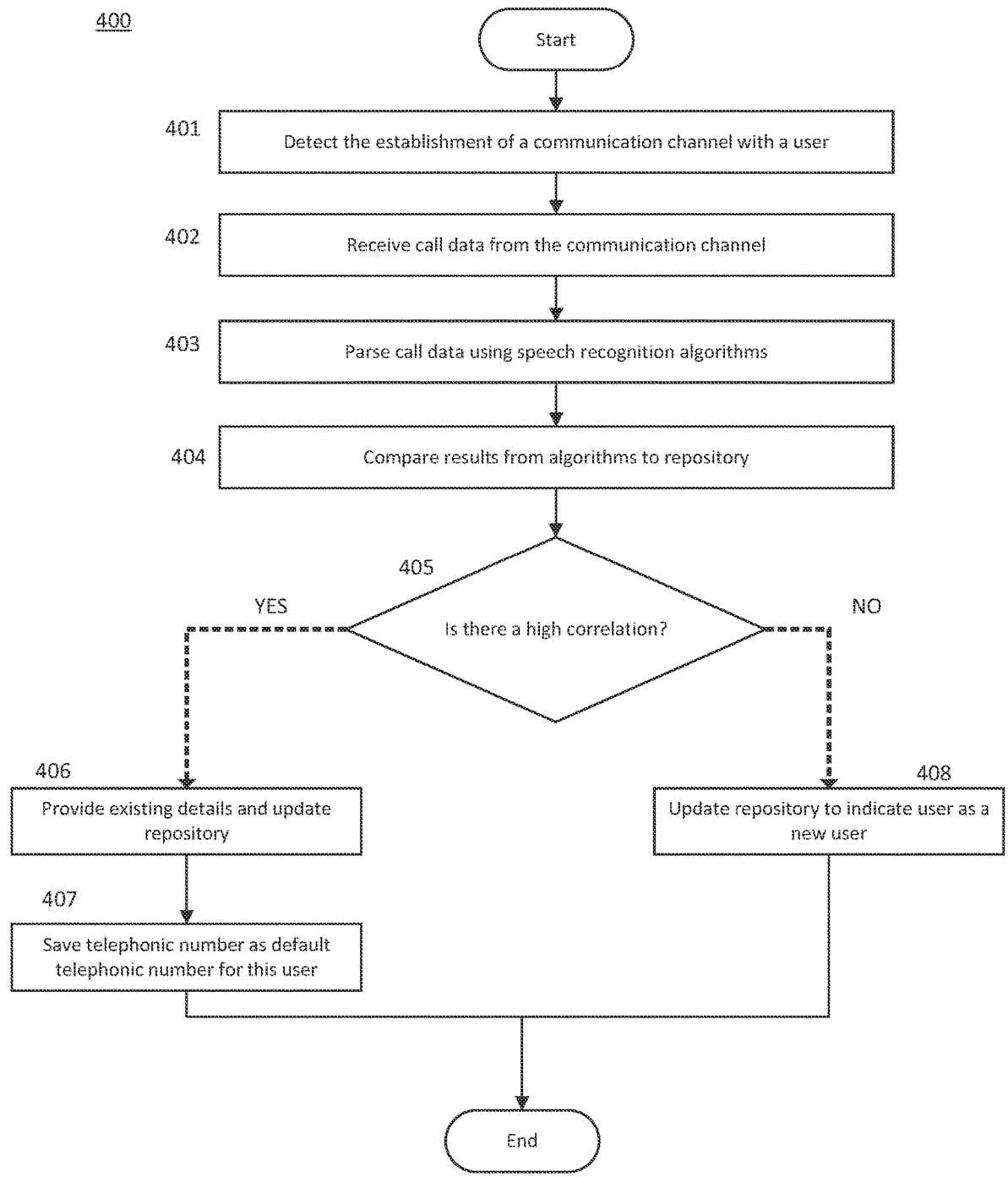
FIG. 4 is a flowchart illustrating a method of applying speech recognition algorithms to identify a user on a communication channel.

FIG. 4 is a flowchart illustrating a method of applying speech recognition algorithms to identify a user on a communication channel. At 401, the system detects that a communication channel has been established with a user. Doing so can include, for example, dialing a phone number associated with the user on a softphone or connecting with the terminal associated with the phone number. In some embodiments, 401 can include the steps described in conjunction with 301, 302, 303, and 304 of FIG. 3.

At 402, call data from the communication channel is received by the system (e.g., a server). The data can include metrics regarding the call such as how long it took for the user to answer, area code, data representing the sound during call (e.g., voices or background noises), and other data indicative of a phone call. In some embodiments, the data can be sent in batches based on, for example, time intervals, user input, or the termination of a call. In some embodiments, the call data can be transmitted in real-time or near-real-time. Thus, the system may be able to provide the caller with relevant information as the call is on-going.

At 403, the system parses the call data using speech recognition algorithms. Speech recognition algorithms is a broad term which can include any algorithm that helps link a voice to a user. For example, speech recognition algorithms can include frequency detection algorithms, which can help with, for instance, distinguishing voice data from background noise. In some embodiments, speech recognition algorithms can be used to distinguish a live voice from a pre-recorded voice. For example, VAD algorithms, described above, can be used to determine that a live voice is present on the communication channel.

In some embodiments, the system can apply multiple algorithms at 403. For example, multiple algorithms can be applied in a pipeline such as that the output from one or more algorithms becomes the input to one or more other algorithms. In some embodiments, the system can apply multiple algorithms in parallel. For example, the algorithms can provide multiple outputs, where each output signifies a different characteristic of the call data. For example, one algorithm can be applied to determine whether a live voice is present, while another can be applied to determine if a previous exchange had a similar voice.

At 404, the system compares the results from the speech recognitions to data stored in a repository. The repository can include data from previous calls, results from the analysis from previous call data, classifications of previous interactions, etc. Comparing the data can include comparison of numeric values, classifications, or pairings (e.g., phone number to voice). For example, the current call can have a voice within a certain range of frequencies. Thus, the system can compare the numeric values of the frequencies with frequencies from prior calls.

At 405, the system can determine if there is a high correlation between the call data from the current call and a previous call based on the comparisons performed at 404. If there is a high correlation, the system, at 406, can provide existing details (e.g., name, business, or location) and update the repository with the current data. Additionally, at 407, the system can save the number as a default for this user. If there isn't a high correlation, at 408, the system can determine that this is a new user and update repository accordingly.

Processing System

Figure 5:
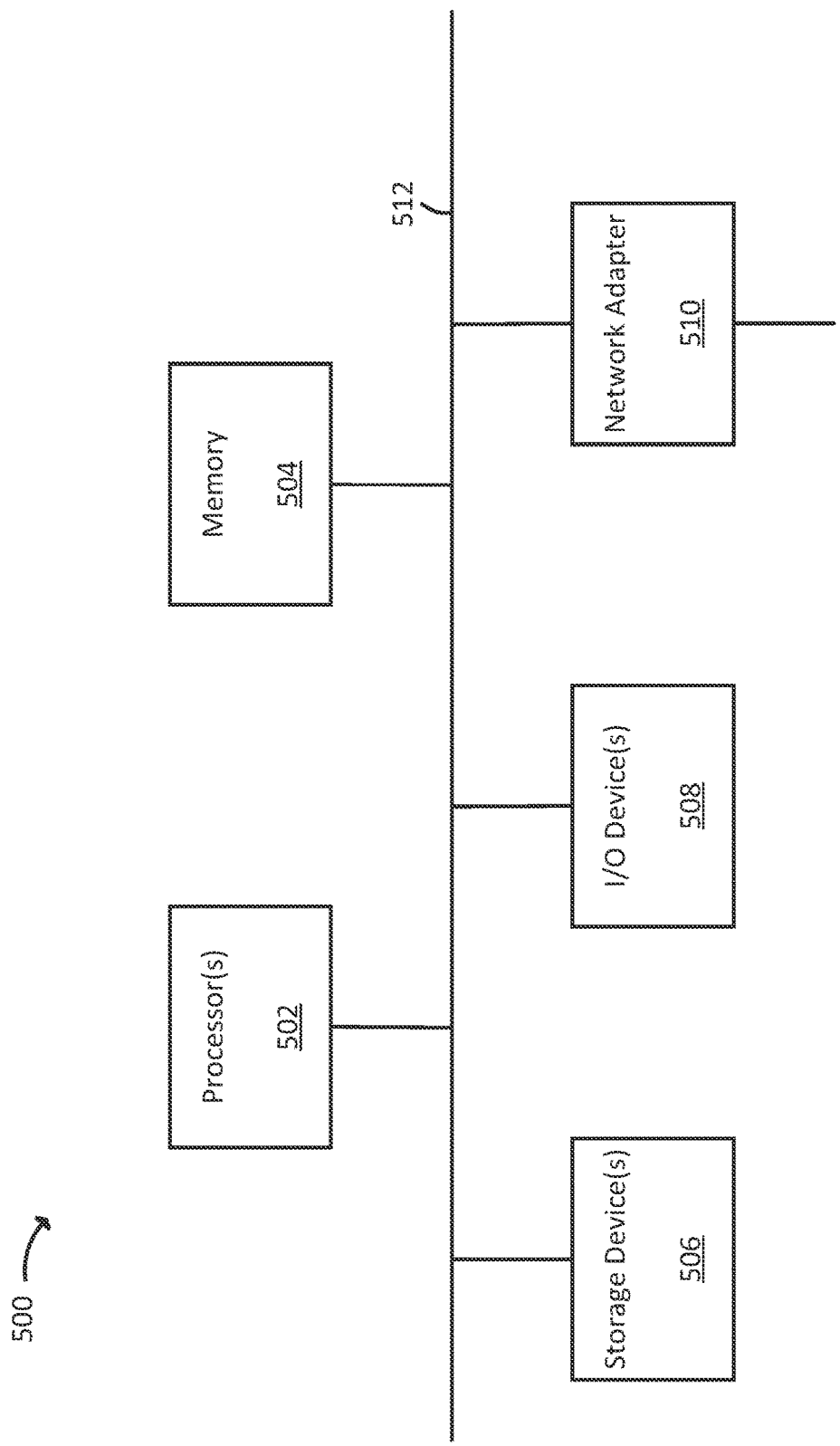
FIG. 5 is a block diagram illustrating a diagrammatic representation of a machine in the example form of a computer operable to perform aspects of the disclosed technology.

FIG. 5 is a block diagram of a computer system that may be used to implement features of some of the disclosed technology. The computing system 500 may be a modular, a server computer, a client computer, a personal computer (PC), a user device, a tablet PC, a laptop computer, a personal digital assistant (PDA), a cellular telephone, an IPHONE, an IPAD, a BLACKBERRY, a processor, a telephone, a web appliance, a network router, switch or bridge, a console, a handheld console, a (handheld) gaming device, a music player, any portable, mobile, handheld device, wearable device, or any machine capable of executing a set of instructions, sequential or otherwise, that specify actions to be taken by that machine.

The computing system 500 may include one or more central processing units ("processors") 502, memory 504, storage device(s) 506 (e.g., disk drives), I/O device(s) 508 (e.g., keyboard and pointing devices, touch devices, display devices), and network adapters 510 (e.g., network interfaces) that are each connected to an interconnect 512. The interconnect 512 is illustrated as an abstraction that represents any one or more separate physical buses, point to point connections, or both connected by appropriate bridges, adapters, or controllers. The interconnect 512, therefore, may include, for example, a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (i.e., FIREWIRE).

The memory 504 and storage devices 506 are computer-readable storage media that may store instructions that implement at least portions of the various embodiments. In addition, the data structures and message structures may be stored or transmitted via a data transmission medium (e.g., a signal on a communications link). Various communications links may be used (e.g., the Internet, a local area network, a wide area network, or a point-to-point dial-up connection). Thus, computer readable media can include computer readable storage media (e.g. non-transitory media) and computer readable transmission media.

The instructions stored in memory 504 can be implemented as software and/or firmware to program the processor 502 to carry out actions described above. In some embodiments, such software or firmware may be initially provided to the computing system 500 by downloading it from a remote system through the computing system 500 (e.g., via network adapter 510).

The various embodiments introduced herein can be implemented by, for example, programmable circuitry (e.g. one or more microprocessors, programmed with software and/or firmware), or entirely in special-purpose hardwired circuitry (i.e., non-programmable circuitry), or in a combination of such forms. Special-purpose hardwired circuitry may be in the form of, for example, one or more application-specific integrated circuits (ASICs), programmable logic devices (PLDs), field-programmable gate array (FPGAs), etc.

CONCLUSION

The embodiments set forth herein represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of the terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A device for telephonic communication, the device comprising:
   a top surface including a plurality of buttons and displays, the plurality of displays operable to display a plurality of softphones and identification information related to a user;
   a processor operable to generate a call list, wherein the call list includes a plurality of telephonic numbers and the identification information related to the user; and
   a memory having instructions stored thereon that, when executed by the processor, cause the processor to:
      establish a communication channel between a first telephonic number and an external device associated with the first telephonic number; and analyze call data from the communication channel, wherein analyzing the call data further includes:
upon determining that the user is active on the communication channel, storing, in the memory, the first telephonic number as a default telephonic number for the user; and
upon determining that the user is not active on the communication channel, disconnecting the communication channel.

2. The device of claim 1 further comprising a vibration device configured to provide haptic feedback by vibrating.

3. The device of claim 1, wherein the top surface is a touch sensitive surface configured to detect changes in capacitance caused by an object being in close proximity to the top surface.

4. The device of claim 1 further comprising a communication device configured to communicate to the external device via a communication protocol.

5. The device of claim 1 wherein the plurality of buttons can be any of physical buttons or electronically displayed buttons.

6. A device for analyzing communication channels between multiple terminals and a softphone, the device comprising:
a top surface including a plurality of buttons and displays, the plurality of displays operable to display a plurality of softphones and identification information related to a user;
a processor operable to generate a call list, wherein the call list includes a plurality of telephonic numbers and the identification information related to the user; and
a memory having instructions stored thereon that, when executed by the processor, cause the processor to:
group the plurality of telephonic numbers into groups of telephonic numbers based on the identification information;
associate a first group of telephonic numbers of the groups of telephonic numbers with a first group of softphones, wherein the groups of telephonic numbers are associated with a first set of terminals;
form a first batch of communication channels with the first set of terminals and the first group of softphones; and
analyze call data from the first batch of communication channels, wherein analyzing the call data further includes:
applying voice recognition algorithms, the voice recognition algorithms being operable to determine whether the user is active on a first communication channel of the first batch of communication channels;
upon determining that the user is active on the first communication channel, disconnecting other communication channels among the first batch of communication channels and providing closing documents;
upon determining that the user is not active on the first batch of communication channels, disconnecting the first batch of communication channels; and
establishing a second batch of communication channels between a second group of softphones and a second set of terminals associated with a second group of telephonic numbers.

7. The device of claim 6, wherein said applying voice recognition algorithms further comprises:

comparing, by the processor, the call data to previous call data using speaker recognition algorithms, wherein the previous call data is indicative of previous interactions with the user, and wherein the call data and the previous call data include data indicative of voice characteristics of the user.

8. The device of claim 7, wherein the voice characteristics of the user includes numeric values of frequencies of a voice of the user.

9. The device of claim 6, wherein said forming the first batch of communication channels further includes:
establishing, by the processor, each communication channel of the first batch of communication channels in succession based on said applying voice recognition algorithms, the voice recognition algorithms being operable to determine whether the user is active on each communication channel of the first batch of communication channels.

10. The device of claim 9, wherein the instructions further comprise: disconnecting, by the processor, each communication channel of the first batch of communication channels prior to forming a succeeding communication channel.

11. The device of claim 6, wherein the processor is operable to transmit the identification information to the first group of softphones.

12. The device of claim 6, wherein the call data includes a time it took for the user to answer, an area code, data representing background sound during a call, or any combination thereof.

13. The device of claim 6, wherein the processor is operable to transmit the call data in real-time or near real-time.

14. The device of claim 6, wherein the identification information includes first name, last name, business name, type of business, location, or any combination thereof.

15. The device of claim 6, wherein the closing documents are any of a sales contract, an agreement to purchase, disclosure documents, a liability waiver, or any combination thereof.

16. The device of claim 6, wherein said providing closing documents further comprises:
connecting, by the processor, to a Customer Relationship Management (CRM) tool.

17. The device of claim 6, wherein said applying voice recognition algorithms further comprises:
associating, by the processor, the first communication channel with a first telephonic number of the first group of telephonic numbers; and storing, in the memory, the first telephonic number as a default telephonic number for the user.

18. The device of claim 6 further comprising a vibration device configured to provide haptic feedback by vibrating when the user is active on the first communication channel of the first batch of communication channels.

19. A device for analyzing communication channels between multiple terminals and a softphone, the device comprising:
a top surface including a plurality of buttons and displays, the plurality of displays operable to display a plurality of softphones and identification information related to a user;
a processor operable to generate a repository, wherein generating the repository further includes:
parsing a source from which to generate the repository, wherein the repository includes a plurality of telephonic numbers and names of a plurality of users associated with the plurality of telephonic numbers;

grouping the plurality of telephonic numbers in a plurality of groups based on the names of the plurality of users; and determining, based on the repository, a first group of telephonic numbers associated with a first user of the plurality of users; and a memory having instructions stored thereon that, when executed by the processor, cause the processor to:

associate the first group of telephonic numbers with a first group of softphones, wherein the first group of softphones form a plurality of communication channels with terminals associated with the first group of telephonic numbers;

apply, based on call data from the plurality of communication channels, voice recognition algorithms operable to determine that the first user is active on a first communication channel of the plurality of communication channels; and in response to determining that the first user is active on the first communication channel, terminate the plurality of communication channels except for the first communication channel.

20. The device of claim 19, wherein the plurality of communication channels is a first plurality of communication channels, the instructions further comprising:

applying, by the processor based on the call data from the first plurality of communication channels, the voice recognition algorithms operable to determine that the first user is not active on the plurality of communication channels; and establishing, by the processor, a second plurality of communication channels between a second group of softphones and terminals associated with a second group of telephonic numbers, wherein the second group of telephonic numbers is associated with a second user of the plurality of users.

* * * * *